Dec. 25, 1951 L. E. DONNELLY ET AL 2,580,084
LAWN ROLLER
Filed July 18, 1946
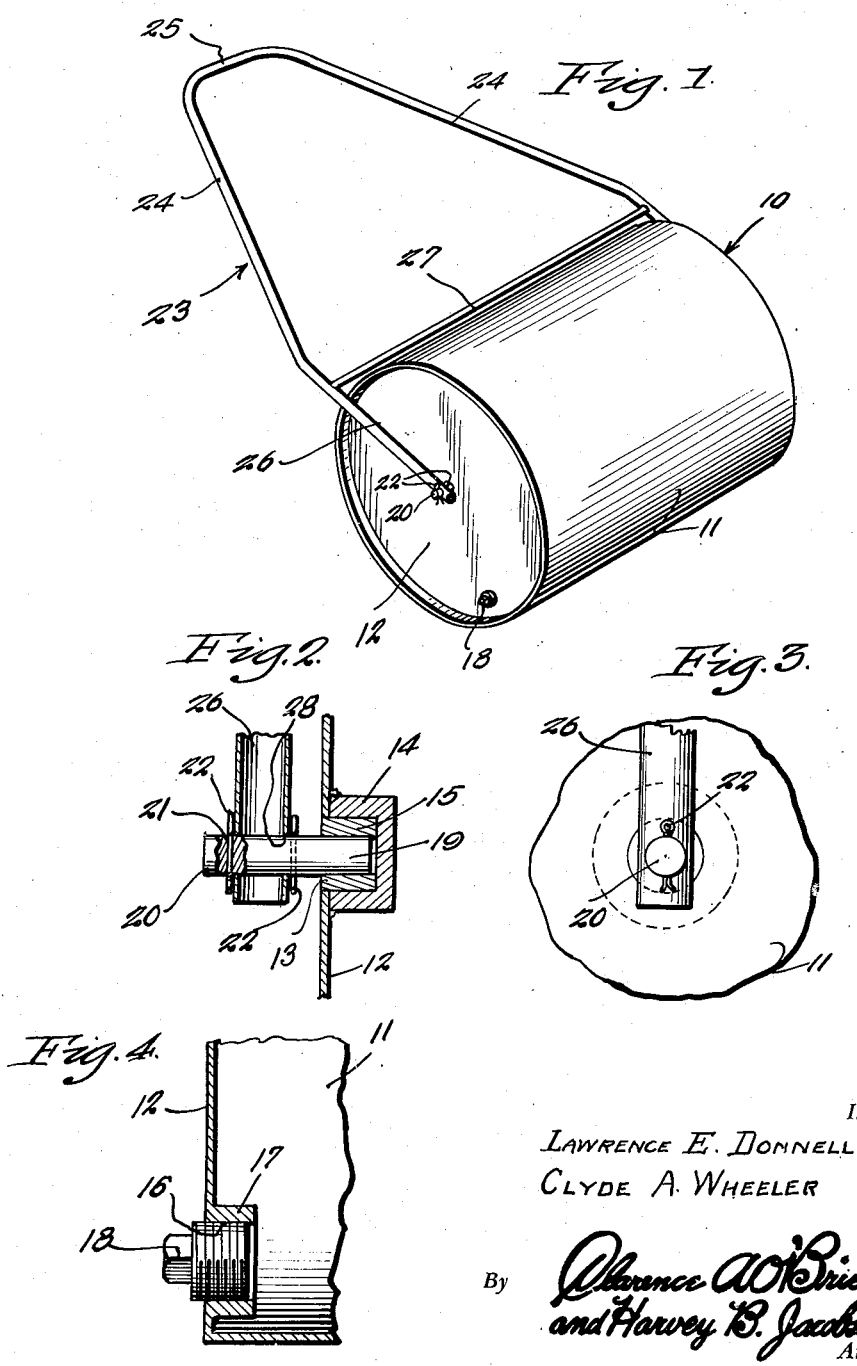
Inventor
LAWRENCE E. DONNELLY
CLYDE A. WHEELER
By Clarence A. O'Brien
and Harvey B. Jackson
Attorneys

Patented Dec. 25, 1951

2,580,084

UNITED STATES PATENT OFFICE 2,580,084

LAWN ROLLER

Lawrence E. Donnelly, Everett, and Clyde A. Wheeler, Melrose, Mass.

Application July 18, 1946, Serial No. 684,508

1 Claim. (Cl. 55—48)

This invention relates to a lawn roller and has for its primary object to roll and smooth a lawn preparatory for cutting and trimming the grass.

Another object is to present a smooth roller surface for contact with the turf in order to assure the production of a smooth velvet-like lawn.

Another object is to effect economies in the construction of lawn rollers without in any way sacrificing the utility of the device.

The above and other object may be attained by employing this invention which embodies among its features a hollow circular cylindrical body, an end closure at each end thereof, each end closure having a central opening, a tubular bearing retaining cup welded to the inner side of each end closure in concentric relation to the opening, a bearing bushing pressed through each opening and into its respective bearing retaining cup, a bifurcated handle and a trunnion carried by each leg of the handle and projecting into the bearing bushing at its respective end of the device.

Other features include a scraper carried by the handle for contacting the outer peripheral surface of the body and cotter pins projecting through the trunnions to hold them in place in the handle and the handle out of contact with end edges of the body.

In the drawings:

Figure 1 is a perspective view of a lawn roller embodying the features of this invention.

Figure 2 is a fragmentary enlarged sectional view through one end closure or head showing in detail the bearing bushing mounting and trunnion, as well as the handle connection, Figure 3 is an end view of Figure 2, and Figure 4 is an enlarged fragmentary sectional view through the hollow cylindrical body showing the filling opening in detail.

Referring to the drawings in detail, my improved lawn roller designated generally 10 comprises a hollow circular cylindrical body 11 closed at opposite ends by end closures or heads 12 each of which is formed with a central opening 13. Welded or otherwise secured to the inner face of each head or end closure 12, in concentric relation to the opening 13 is a bearing retaining cup 14 in which a bearing bushing 15 is pressed. Formed in one end closure 12 is an internally screw-threaded opening 16 which is surrounded by an internally screw-threaded collar 17 which projects inwardly toward the interior of the device, and the opening thus formed provides a filling opening through which water or sand may be introduced into the interior of the roller. A closure plug 18 is adapted to be threaded into the internally screw-threaded opening 16 in order to close the opening after the weight-giving material has been introduced into the body 11.

A handle designated generally 23 is provided for the roller body 11 and comprises a substantially U-shaped frame 24 the bight portion of which forms a handle-bar 25 and the legs of which diverge from the handle-bar 25 toward the roller, and terminate in spaced parallel portions 26. Carried at the junction of the spaced parallel portions 26 with the legs 24 is a scraper 27 which, when the device is in use, is adapted to ride on the outer peripheral surface of the hollow cylindrical body 11 as will be readily understood upon reference to Figure 1. Formed adjacent the extreme free ends of the spaced parallel portions 26 are transversely extending openings 28 in which the end portions 20 of trunnions 19 are received. The trunnions 19 are retained in place on the parallel end portions 26 of the handle by cotter pins 22 which extend through spaced parallel openings 21 in the trunnions.

In use, it will be understood that the handle-bar 25 is grasped in the hands of the user who then pushes or pulls the roller over the lawn to be smoothed. The rolling of the roller beneath the scraper 27 will cause any matter which may cling to the roller to be scraped off so that a smooth surface is always presented to the surface being rolled.

Obviously, the roller may be used not only for rolling turf and lawns, but may also be employed for rolling the surfaces of tennis courts and the like. By removing the plug 18 and introducing sand or water into the interior of the cylindrical body 11, it will be obvious that the device will be given sufficient weight to meet the requirements. After the introduction of the water or sand into the interior of the hollow cylindrical body 11 the plug 18 is of course, restored to the opening 16 and tightened therein so as to avoid leakage.

While in the foregoing there has been shown and described the preferred embodiment of this invention it is to be understood that minor changes in the details of construction, combination and arrangement of parts may be resorted to without departing from the spirit and scope of the invention as claimed.

We claim as our invention:

A lawn roller comprising a hollow circular cylindrical body, an end closure at each end thereof, each end closure having a central opening, an inwardly extending tubular bearing retaining cup welded to each end closure in concentric relation to the opening, a bearing bushing fitted in each bearing retaining cup, a substantially U-shaped handle each leg of which is provided with a transverse opening, a stub shaft extending through each opening and projecting inwardly from its respective leg for reception in the bearing bushing said stub shaft including apertures medially of the length thereof and cotter pins extending through each stub shaft aperture on opposite sides of each leg of the handle to space said handle from said roller body for free rotation thereof.

LAWRENCE E. DONNELLY.
CLYDE A. WHEELER.

REFERENCES CITED

The following references are of record in the file of this patent:

UNITED STATES PATENTS

| Number | Name | Date |
|---|---|---|
| 1,286,564 | Dunham et al. | Dec. 3, 1918 |
| 2,308,110 | Schmeiser | Jan. 12, 1943 |

FOREIGN PATENTS

| Number | Country | Date |
|---|---|---|
| 5,733 | Great Britain | Mar. 6, 1914 |
| 375,606 | Great Britain | June 3, 1932 |
| 817,465 | France | May 24, 1937 |